United States Patent
Frank

(10) Patent No.: US 12,150,226 B2
(45) Date of Patent: Nov. 19, 2024

(54) METHOD FOR OPERATING A HOB, HOB AND HOB SYSTEM

(71) Applicant: E.G.O. Elektro-Geraetebau GmbH, Oberderdingen (DE)

(72) Inventor: Marcus Frank, Sulzfeld (DE)

(73) Assignee: E.G.O. ELEKTRO-GERAETEBAU GMBH, Oberderdingen (DE)

( * ) Notice: Subject to any disclaimer, the term of this patent is extended or adjusted under 35 U.S.C. 154(b) by 241 days.

(21) Appl. No.: 17/457,082

(22) Filed: Dec. 1, 2021

(65) Prior Publication Data
US 2022/0183117 A1 Jun. 9, 2022

(30) Foreign Application Priority Data
Dec. 3, 2020 (DE) ..................... 10 2020 215 319.1

(51) Int. Cl.
| | | |
|---|---|---|
| H05B 6/12 | (2006.01) | |
| H04B 5/00 | (2024.01) | |
| H04B 5/77 | (2024.01) | |
| H05B 6/06 | (2006.01) | |

(52) U.S. Cl.
CPC ............. H05B 6/1236 (2013.01); H04B 5/77 (2024.01); H05B 6/062 (2013.01); *H05B 2213/07* (2013.01)

(58) Field of Classification Search
CPC .... H05B 6/1236; H05B 6/062; H05B 1/0266; H05B 2213/07; H05B 2213/06; H04B 5/0062
See application file for complete search history.

(56) References Cited

U.S. PATENT DOCUMENTS

| | | |
|---|---|---|
| 10,085,303 B2 | 9/2018 | Schilling et al. |
| 10,595,366 B2 | 3/2020 | Frank et al. |
| 2011/0120989 A1* | 5/2011 | Schilling ................ H05B 6/062 219/661 |

(Continued)

FOREIGN PATENT DOCUMENTS

| | | |
|---|---|---|
| DE | 102008054909 A1 | 7/2010 |
| DE | 102009047185 | 6/2011 |

(Continued)

OTHER PUBLICATIONS

German Patent and Trade Mark Office, Office Action received for Application No. DE 102020215319.1, dated Aug. 27, 2021, 10 pages, Germany.

(Continued)

*Primary Examiner* — Dana Ross
*Assistant Examiner* — Kuangyue Chen
(74) *Attorney, Agent, or Firm* — Alston & Bird LLP

(57) ABSTRACT

In the interests of improved temperature detection and temperature control of a cooking appliance on a hob by means of an induction coil, the cooking appliance has specific and individual identification. This can be contained in an NFC tag, by way of identification means. This identification can be read out on a hob, either by means of the hob itself or by means of a mobile telephone, and transferred to a database in an Internet cloud storage facility. From the latter, specific characteristics for this cooking appliance can be downloaded and employed for a temperature-controlled heating of the cooking appliance.

18 Claims, 2 Drawing Sheets

(56) References Cited

U.S. PATENT DOCUMENTS

2019/0125120 A1* 5/2019 Jenkins ................ F24C 15/105

FOREIGN PATENT DOCUMENTS

| DE | 102014102531 A1 | 9/2015 | | |
|---|---|---|---|---|
| DE | 102016222313 A1 | 5/2018 | | |
| EP | 3111144 B1 | 7/2020 | | |
| WO | WO-2015128578 A2 * | 9/2015 | ............ | A47J 36/321 |

OTHER PUBLICATIONS

European Patent Office, Extended European Search Report received for EP Application No. 21209798.4, dated Apr. 26, 2022, 11 pages, Germany.

* cited by examiner

METHOD FOR OPERATING A HOB, HOB AND HOB SYSTEM

CROSS-REFERENCE TO RELATED APPLICATIONS

This application claims priority to German Application No. 10 2020 215 319.1, filed Dec. 3, 2021, the contents of which are hereby incorporated herein in its entirety by reference.

FIELD OF APPLICATION AND PRIOR ART

The invention relates to a method for operating a hob for the heating of a cooking appliance, particularly for the preparation of a foodstuff contained therein, a hob for the execution of this method, and a hob system comprised of a hob of this type and at least one cooking appliance.

From DE 102016222313 A1, the employment of an "automatic program" is known for the heating of a cooking appliance with food to be cooked contained therein, namely, a pot containing eggs which are to be cooked. In order to permit the execution of this automatic program, or as a control variable, a temperature of the cooking appliance base is employed. This can be detected in a contactless arrangement, from below, through a hob plate, wherein operating data from the actuation of an induction heating coil for the heating of the cooking appliance are evaluated. In this specific case, this is entirely possible, as eggs are prepared in boiling water, and the temperature of a cooking appliance base, in the presence of boiling water, can be established relatively easily in the above-mentioned manner. It is known that the cooking appliance base cannot undergo heating significantly in excess of 100° C., at least provided that water is present in the cooking appliance.

Object and Solution

The object of the invention is the provision of a method of the above-mentioned type for operating a hob, a hob of this type, and a hob system comprised of a hob of this type and a cooking appliance, by means of which problems associated with the prior art can be resolved and wherein, in particular, the targeted and accurate heating of the cooking appliance can be achieved, preferably in a manner which is individually tailored to the cooking appliance.

This object is fulfilled by a method, a hob, and a hob system having the features the accompanying claims. Advantageous and preferred configurations of the invention are the subject matter of the further claims, and are described in greater detail hereinafter. Some features are described only in respect to the method, only in respect to the hob, or only in respect to the hob system. These features can nevertheless apply to both a method and a hob, and to a corresponding hob system, in a standalone and mutually independent manner. The wording of the claims is established by explicit reference to the content of the description.

The hob comprises a hob plate and at least one heating device, advantageously a number of heating devices, arranged below the hob plate. These are employed for the heating of a cooking appliance which is positioned on the upper surface of the hob plate. Although the heating devices are advantageously configured in the form of induction heating coils, other types of heating can also be employed, for example, radiation heating devices. The hob moreover comprises a hob control circuit, a power supply for the at least one heating device, and a communication device which is configured to communicate with a counterpart communication device which is arranged externally to the hob. The hob control circuit can thus communicate, in a manner of speaking, with the exterior. This communication can, on the one hand, be executed wirelessly, which is technically straightforward and involves only a limited complexity of installation. Alternatively, communication of the hob control circuit or the hob with the exterior can also be executed by means of a LAN cable, i.e. in a wired arrangement. The cooking appliance comprises a cooking appliance base, together with contactlessly readable or scannable identification means incorporating identification of the cooking appliance, or with respect to the cooking appliance, i.e. information or an identifier which is specific to the cooking appliance concerned. This identification is thus an element of information which is "stored" in the identification means. The identification means can be read out or retrieved in a contactless arrangement, permitting said information, identification or identifier to be disclosed accordingly, for example, optically or by scanning or, alternatively, by radio.

The cooking appliance can preferably be a type of cooking vessel or pot or pan, but can also have or comprise an external shell or cladding, by means of which the visual similarity to an actual functional appliance such as, for example, a fryer or an egg boiler, is established. The information, identifier or identification of the cooking appliance is tailored to this specific cooking appliance in an entirely individual manner, such that no other individual cooking appliance of a mutually identical type carries the same identification. Alternatively, a type classification of a cooking appliance can be designated, such that identically configured cooking appliances carry the same information, identifier or identification.

In the method, the following steps are executed. The identification of the cooking appliance is read out from the identification means, depending upon the configuration thereof. For example, this can be executed, in a known manner, optically or by means of radio. In one configuration of the invention, this can be executed by the hob itself. In another configuration of the invention, however, this is executed by an external device, advantageously by a portable terminal device, such as a smartphone or a tablet computer. This identification read out is then advantageously delivered to the location at which the read-out is to be executed, i.e. it is then delivered to the hob control circuit or to an above-mentioned external device or portable terminal device. Thereafter, by means of its communication device, the hob control circuit connects to a counterpart communication device, which is arranged externally to the hob, either wirelessly by radio, or by means of a network cable, which is advantageously arranged in an appliance. This counterpart communication device, in turn, is connected to an information-gathering facility, which can advantageously be configured in the form of an Internet connection to a database or to a cloud storage facility. This counterpart communication device might be configured, for example, in the form of a WLAN access point, which is located in a house or in a room, and to which the hob or its communication device can connect or, alternatively, in the form of a LAN network. The hob can thus be connected to the above-mentioned database or cloud storage facility. Alternatively, an above-mentioned external device or portable terminal device, for example a smartphone or a tablet computer, can be provided, wherein said portable terminal device then connects to the database or to a cloud storage facility via the Internet. In this case, a wireless connection to the external device or to the portable terminal device is preferable.

In the information-gathering facility, characteristics or parameters with respect to the physical properties of the detected or identified cooking appliance are then stored. Information on these characteristics can be relatively comprehensive, as a result of which, in some cases, they are not included directly in the identification means itself. These above-mentioned characteristics include at least one element of information from the following group: regulating characteristics, control characteristics, operating characteristics or display characteristics. By reference to the regulating characteristics or control characteristics of the cooking appliance, a more accurate and potentially more convenient temperature adjustment of the cooking appliance can be achieved, as these characteristics can include parameters which permit the more effective evaluation of a specific response of the cooking appliance. Other characteristics can enhance convenience of operation. In the event of inductive temperature measurement, for example, these parameters can comprise characteristics with respect to the appliance base material and the permeability response thereof as a function of temperature. Moreover, in the event of optical temperature measurement methods, these characteristics might relate to radiation emission response as a function of temperature.

Characteristics or information with respect to the cooking appliance are uploaded to the hob control circuit and, in particular, are stored in a memory of the hob control circuit. Under some circumstances it appears, as a result, that this memory is employed whenever this cooking appliance is used in conjunction with this hob. Alternatively, this information with respect to the cooking appliance can be comprised in-factory, or can be stored in the hob control circuit or a memory thereof further to an initial and one-off download, then fetched or retrieved back into the foreground for the heating of the cooking appliance on the hob.

The cooking appliance is then either already positioned on the hob plate, above at least one heating device, or is firstly positioned thereupon. Although both options are possible, it is important that information should be available for use by the hob control circuit. The hob control circuit then calculates or receives data or information with respect to the heating device or heating devices above which the cooking appliance is positioned. A pot detection device, which is well known per se, can be employed for this purpose. This then actuates the heating device or heating devices concerned for the heating of the cooking appliance, wherein the downloaded, and optionally stored information or characteristics with respect to this individual cooking appliance are used or employed. If, for example, accurate characteristic data for the cooking appliance base are known, for example with respect to the size and/or material and/or response thereof in specific cases, the temperature thereof can be determined in a highly accurate manner, by means of an induction heating coil. It can be provided that a temperature of the cooking appliance base is measured by means of inductive coupling with a natural resonance measuring circuit in the cooking appliance base, or by means of an oscillating circuit comprising the cooking appliance base and an induction coil. In this regard, reference may be made, for example, to U.S. Pat. Nos. 10,085,303 B2 or 10,595,366 B2, which include a description thereof. A characteristic temperature value or temperature of the cooking appliance or of the cooking appliance base is detected by the hob, by reference to cooking appliance-specific information. A temperature-controlled heating is then executed, potentially in accordance with a predefined and specific temperature or a predefined and specific temperature characteristic, wherein this heating is executed by means of the heating device. Cooking appliance-specific information is employed for this purpose, whether additionally downloaded from the Internet or retrieved, in a specific case, from a memory of the hob control circuit.

An accurate heating of the cooking appliance is thus possible, wherein the hob control circuit is exactly aware of the specific cooking appliance which is to undergo heating. The detected temperature of the cooking appliance or of the cooking appliance base corresponds to the heat thereof, which can be detected as a physical property. The characteristic temperature value thus obtained is then expressed as an element of information which proceeds therefrom. It is thus expressed, not in ° C., but in the form, for example, of an impedance, current strength, phase displacement, frequency or similar.

In one configuration of the invention, it can be provided that the hob has or comprises a hob display. On this hob display, a power output of the heating device, advantageously divided into power increments, in a manner which is known per se from the prior art, and/or a temperature of the cooking appliance or of the cooking appliance base is displayed. In the interests of the understanding of this information by an operator, an actual temperature in ° C. is displayed. In some processes, for example during the frying of a steak in a cooking appliance in the form of a pan, or during the frying of chipped potatoes in a cooking vessel in the form of a pot, corresponding to a cooking appliance in the form of a fryer, this information can be of significance to the operator. This can be executed additionally or alternatively to the consideration of temperature in an above-mentioned automatic cooking program.

On an above-mentioned hob display, general information on the cooking appliance can also be indicated, in particular the type of cooking appliance and/or a description of the cooking appliance. This may be of potential benefit to the operator during the cooking process.

In a further configuration of the invention, the hob can have or comprise an operator control device which can afford a variety of operator control functions. Advantageously, this is achieved by means of touch-sensitive switches, a touchscreen or touch display. It is possible for the operator control device, in its appearance and/or with respect to its operator control functions, to be tailored to the type of cooking appliance, or to the specific and particular individual cooking appliance concerned. This is advantageously achieved by means of information on the cooking appliance, which is delivered to the hob control circuit in the above-mentioned manner. The hob can thus adapt intelligently to the options associated with the cooking apparatus.

In a further configuration of the invention it is possible that, for the heating of the cooking appliance, various target temperatures can be specified. In particular, an operator can input the target temperature on an above-mentioned operator control device. Target temperatures of this type can be indicated on an above-mentioned hob display, such that this information is available to the operator. Although the target temperature can thus be entered by the operator, it is alternatively possible for this target temperature to be dictated by an automatic cooking program. It may then be beneficial for the operator to view this information. The hob control circuit can execute a temperature setting of the cooking appliance, or the cooking appliance base thereof, to the exact temperature or target temperature required, by the corresponding actuation of the at least one heating device which is covered by the cooking appliance.

In one configuration of the invention, in addition to the above-mentioned target temperatures, a variety of further setting parameters, for example with respect to a degree of cooking, finishing consistency, starting consistency, finishing temperature, starting temperature, cooking method or similar, relating to the food to be cooked, can be entered in the hob or the hob control circuit. This is advantageously executed on the above-mentioned operator control device, particularly in combination with an above-mentioned hob display. Moreover, these parameters, values or information can be displayed on the hob display. It is thus possible for the hob control circuit to execute a temperature setting of the cooking appliance or the cooking appliance base to the required finishing temperature, by means of the at least one heating device.

As an alternative to the arrangement of the operator control device and/or of the hob display on the hob itself, i.e. as an integrated constituent thereof, it is also possible for operations to be conducted on an external operator control device, which is preferably provided for the operation of the hob. Advantageously, this is a portable terminal device, such as a smartphone, a tablet computer or similar. This device can assume at least a proportion of the display functions and/or operator control functions for the hob. However, it is not necessary for all operator control functions to be provided on the external portable operator control device—the provision of a number of functions is sufficient. Accordingly, by means of an external portable operator control device of this type, an extension of available functions for the hob can be achieved, thereby opening a variety of novel options for the operation of a hob.

The induction coil for measuring the temperature is advantageously an induction heating coil of the hob, as described with reference to the above-mentioned prior art, to which explicit reference is made here. The above-mentioned information from the information-gathering facility for this cooking appliance, which is saved or stored in the hob control circuit, can now be employed for the adjustment of the heating of the cooking appliance, particularly for the adjustment of a control for the heating or temperature setting thereof.

The induction coil in the above-mentioned oscillating circuit is advantageously the at least one induction heating coil, by means of which the cooking appliance is heated on the hob.

In an advantageous configuration of the invention, the hob has or comprises a pot detection device. It can thus be detected whether and where a cooking appliance is present on the hob plate. Inductive pot detection sensors which are known per se can be employed for this purpose, for example in the form of inductive sensors or small induction coils. It is possible for these to be provided additionally to the above-mentioned induction heating coils. It is known from the prior art how both of the above can respectively be employed to execute a cooking appliance detection function.

In a first basic configuration of the invention, it is possible for the identification means of the cooking appliance to be read out by an identification device in the hob itself. This identification device is thus present in the hob itself, and constitutes an integral constituent thereof. It is possible, for example, for the identification means to comprise an RFID tag or an NFC tag on the cooking appliance, which contains cooking device-specific information.

Cooking appliance-specific information can then comprise, for example, a multi-character numerical or alphanumerical code, which is associated with characteristics of the cooking appliance from the above-mentioned information-gathering facility. The hob then has or comprises key elements, by means of which it can independently achieve the objective for the retrieval of these characteristics of the cooking appliance.

In a practical configuration, it can be provided that a specific identification region is arranged on the hob. If the cooking appliance, with its identification means, is positioned in this identification region, the identification device of the hob will be able to detect the identification means there, and to read out information therefrom. Depending upon the configuration of the identification means and the identification device, this can be executed over a distance of a few or a number of centimetres, particularly between 1 cm and 20 cm, or only 10 cm. Accordingly, it is not necessary for the positioning of the cooking appliance to be absolutely accurate. Alternatively, the identification means can also be an above-mentioned QR code or barcode, which can be read out by scanning by a camera on the hob, which might also potentially be arranged under a light-permeable hob plate. However, this is considered as a more difficult option.

The employment of an above-mentioned identification region provides a major advantage, in that it can thus be ensured that only a single cooking appliance is present therein, provided that the identification region is not configured to excessively large dimensions. Potential detection errors are then reduced accordingly.

In a further configuration, an identification region of this type can also be employed for the inductive charging of an external portable terminal device, in a manner which has become known in recent years. In particular, an above-mentioned portable terminal device can thus be charged, which can be employed for the read-out of the identification of the cooking appliance from the identification means and/or for connection to the external information-gathering facility.

In a second basic configuration of the invention, a portable terminal device is mandatorily employed for the reading out of identification means of the cooking appliance. In this case, in particular, it is appropriate that the identification means should be optically detectable and are configured, for example, in the form of a printed or affixed QR code or barcode. Alternatively, however, an above-mentioned RFID or NFC tag on the cooking appliance can also be read out. The identification thus read out can then be transmitted from the portable terminal device via the communication device to the hob or the hob control circuit, and is thus made available to the latter.

In one potential configuration of the invention, the communication device can be configured such that it connects independently or directly to the Internet, or to a cloud storage facility, in order to download corresponding information for the characteristics of the cooking appliance into the hob. The hob control circuit can thus feed the memory directly.

In an alternative potential configuration of the invention, the hob, with the communication device, can constitute a communication link with the exterior, but using an above-mentioned portable terminal device, such that said portable terminal device connects to the Internet or to a cloud storage facility. Identification of the cooking appliance is then included in the cloud, or a search for the corresponding cooking appliance is executed in the cloud accordingly. The relevant information or characteristics are firstly downloaded from the cloud to the portable terminal device, then transferred from the latter via the communication device to the hob control circuit. The circumstance is thus advantageously employed whereby numerous persons or households already possess and use portable terminal devices of this type, and are thus accustomed to their use. In particular, it is thus possible to eliminate the need for any hardware for the constitution of a relatively complex WLAN connection or similar data connection. The requisite secure Internet connection can also be more effectively achieved by means of portable terminal devices which are very extensively used for this purpose, of the type described above.

It can be provided that at least a proportion of information on the properties of the actual cooking appliance is contained in the identification means itself. This then includes, potentially, not only an individual identifier, which permits the accurate identification and classification of the cooking appliance. Instead, it is possible for previously defined properties or advantageous operating parameters to be included therein. It is also possible that, in the hob control circuit itself, a preloaded data pool is already present. By reference to the identification of the cooking appliance, appropriate information for the cooking appliance can then be employed.

The counterpart communication device can be provided in, or constituted by an above-mentioned portable terminal device. These are extensively configured, by means of a WLAN function, to connect to a WLAN radio network or an access point, in order to constitute an Internet connection.

It can further be provided that information concerning the cooking appliance from the external information-gathering facility, for example regulating characteristics, control characteristics, operating characteristics, display characteristics or similar for a cooking appliance are only downloaded from the information pool on a one-off basis. They are then stored in the hob control circuit, and can be retrieved from the latter for future use. It is thus established that the operator has placed the cooking apparatus on the hob for identification, as described above, has selected the latter using an operator control device, or has identified the latter using an above-mentioned portable terminal device.

A cooking appliance, by way of an element of a hob system according to the invention, can be, for example, a metal pot, or at least a pot having a metallic base, of a type which is known per se. It thus carries the identification means. Alternatively, the cooking appliance can also be at least partially clad in elements, by means of which, in practice, it is endowed with the functional properties of above-mentioned appliances such as fryers, kettles or egg boilers. A potentially appealing appearance is achieved accordingly.

These and further features proceed from the claims, the description, and the drawings, wherein individual features may be respectively embodied in isolation or in combination, in the form of sub-combinations, in a given embodiment of the invention or in other fields, thus constituting advantageous embodiments which are patentable per se, in respect of which protection is claimed herein. Subdivision of the application into individual paragraphs and sub-headings does not restrict the overall validity of the statements which are included therein.

BRIEF DESCRIPTION OF THE DRAWINGS

Exemplary embodiments of the invention are schematically represented in the drawings, and are described in greater detail hereinafter. In the drawings.

DETAILED DESCRIPTION OF THE EXEMPLARY EMBODIMENTS

Figure 1:
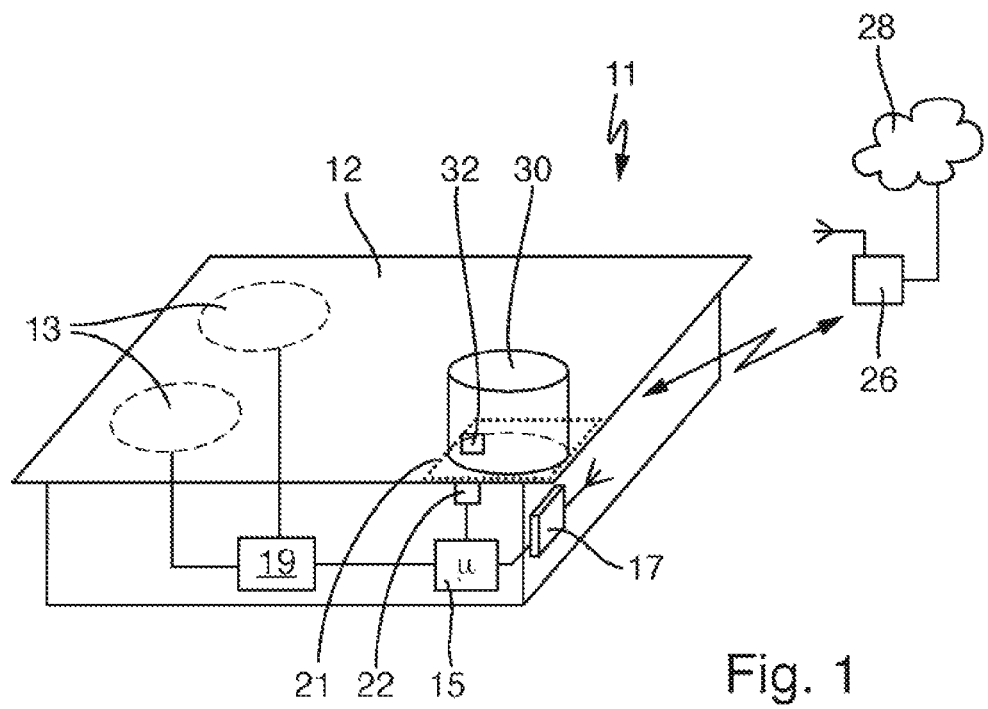
FIG. 1 shows an oblique illustration of a hob according to the invention, having a cooking appliance positioned thereupon, wherein the hob is directly connected to the Internet or to a cloud storage facility.

FIG. 1 shows an oblique illustration of a hob 11 according to the invention, having a hob plate 12 and heating devices 13 arranged thereunder, indicated by broken lines in the left-hand area. The hob 11 comprises a hob control circuit 15, advantageously having a microcontroller and a memory for this purpose, which comprises a counterpart communication device 17 for wireless communication. Advantageously, this is configured in the form of a WLAN module, or is WLAN-capable; alternatively, a LAN cable connection can be provided. The hob control circuit 15 can further be connected to an operator control device and/or a display device of the hob 11, which are advantageously provided, but are not represented here. However, operator control devices and display devices of this type will be sufficiently familiar to persons skilled in the art, such that they can be provided in this context with no difficulty.

The hob control circuit 15 is connected to a power supply 19 of the hob 11. By means of the power supply 19, the former can respectively actuate the heating devices 13, in accordance with operator instructions or in accordance with the above-mentioned automatic cooking programs, for the execution of cooking processes. Finally, the hob control circuit 15 is further connected to an NFC reader 22, which is arranged in the vicinity of an identification region 21, indicated by a dotted line. The NFC reader 22 can thus detect an NFC tag which is present in the identification region 21, in order to execute the reading out thereof and the retrieval of information therefrom.

On the right-hand side of FIG. 1, a WLAN access point 26 is represented, which is installed in the household in which the hob 11 is accommodated. The hob control circuit 15 can communicate by means of the counterpart communication device 17 with this WLAN access point 26, for the bidirectional transmission of data. The WLAN access point 26 is connected via an Internet connection to an Internet cloud storage facility 28, by way of a database in which the requisite characteristics of various cooking appliances are stored. Databases of this type can be operated by manufacturers of cooking appliances or by other service providers or, alternatively, by the manufacturer of the hob 11.

A cooking appliance 30, having a cooking appliance base which comprises an NFC tag 32, is positioned on the identification region 21. The cooking appliance 30 can be a kettle, but might also be another above-mentioned pot, for example an egg boiler or a fryer. The NFC tag 32 is arranged in the lower region thereof, such that it is as close as possible to the NFC reader 22, in the interests of trouble-free reading out. The NFC tag incorporates identification, for example a number or an identifier, which is read out by the NFC reader 22 and transmitted to the hob control circuit 15. The hob control circuit 15 then sends this identification or identifier via the WLAN connection 17 and 26 to the cloud storage facility 28. Herein, the corresponding characteristics for this specific cooking appliance 30 are then retrieved, and are sent back via the WLAN connection to the hob control circuit 15. The latter can thus achieve the improved operation or the more effective heating of the cooking appliance 30.

To this end, the cooking appliance 30, further to the reading out of the identification, is arranged above one of the heating devices 13 for the heating thereof. The heating devices 13 are advantageously induction heating coils and thus, by means of the above-mentioned method, can effectively detect the temperature of a base of the cooking appliance 30. As these devices are now aware of the exact properties and regulating characteristics of the cooking appliance concerned 30, or the cooking appliance base thereof, temperature detection, and thus temperature-controlled regulation, can be executed in a substantially superior manner. The temperature or a predefined characteristic temperature value of the cooking appliance 30, or of the cooking appliance base thereof, can be detected and employed accordingly.

The identification region 21 provides the above-mentioned advantage in that, in this case, only the provision of an NFC reader 22 is then required, but no further regions for this purpose. In a manner of speaking, the hob 11 itself can thus read out the identification of the cooking appliance 30, which is transmitted by means of its own counterpart communication device 17 to the cloud storage facility 28, from which information on the desired characteristics can then be sourced. Accordingly, cooking appliances, together with specific characteristics thereof, can be employed which have been developed subsequently to the manufacture of the hob 11 or the programming of the hob control circuit 15, and can be operated or undergo heating accordingly using the hob 11.

The identification region 21 can also be arranged at a different location on the hob 11. Advantageously, it is sufficiently removed from any heating device 13 to prevent any damage to the NFC reader 22. However, it might also be arranged in direct proximity to the hob, such that the pot and the base thereof are arranged above the heating device, whereas the NFC tag 32, however, is arranged above the NFC reader 22. This would be possible, for example, if the NFC tag 32 were located in a projecting handle of the pot.

Figure 2:
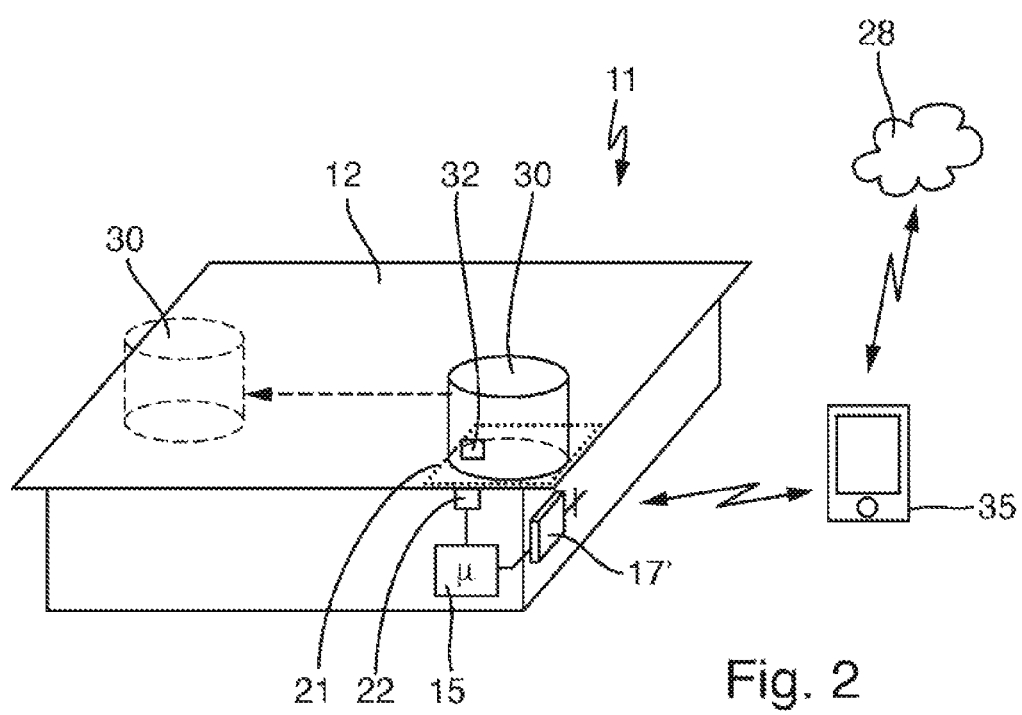
FIG. 2 shows a variation of the hob according to FIG. 1, which is indirectly connected to the Internet or to a cloud storage facility via a mobile telephone.

In the alternative configuration according to FIG. 2, the hob 11 also comprises the identification region 21 having an NFC reader 22, together with a hob control circuit 15 and a power supply 19. The hob control circuit 15 is also connected to a counterpart communication device 17' which, in this case, is configured in the form of a Bluetooth module or BLE module. Accordingly, this circuit does not communicate directly with the WLAN connection or a WLAN access point, but with a mobile telephone 35 by Bluetooth. The identification read out from the cooking appliance 30, which is contained in the NFC tag 32 thereof, is thus transmitted from the hob control circuit 15 to the mobile telephone 35 by Bluetooth. The mobile telephone 35 in turn establishes a mobile data connection with the Internet or with the cloud storage facility 28, for the transmission of identification. As described above, the requisite and desired characteristics of the cooking appliance 30 are then transmitted to the mobile telephone 35, and transmitted in turn, by Bluetooth, to the hob control circuit 15. These characteristics are stored herein, and are employed for the temperature-controlled heating of the cooking appliance 30, as described above. Again, this is a problem-free and practicable process, which only differs from that described above in that data transmission is executed using a different standard, and a mobile telephone 35 or another portable terminal device which accommodates the above-mentioned data transmission standard is employed. Naturally, by way of variation, it is also easily conceivable that the mobile telephone 35, in a similar manner to FIG. 1, connects by WLAN to a WLAN access point, which is then in turn connected to the cloud storage facility.

FIG. 2 further represents how, further to the reading out of the characteristics of the cooking appliance 30, said cooking appliance 30 can then be displaced leftwards to a position represented by broken lines, advantageously above one of the heating devices 13 according to FIG. 1. Here, the cooking appliance 30 then undergoes temperature-controlled heating by the hob control circuit 15, using an automatic cooking program selected by an operator. For the execution of an exact sequence, for example, it is possible that, further to the positioning of the cooking appliance 30 on the hob 11 or the hob plate 12 in the identification region 21, identification commences immediately, or is initiated by an operator. As soon as the identification has been read out from the NFC tag 32, an acoustic and/or optical indication can be provided to the operator, to the effect that the cooking appliance 30 can be moved over a heating device, where it can then undergo heating, or an automatic cooking program can commence. At the same time, the identification read out can be transmitted to the cloud storage facility 28, in order to permit the retrieval of the desired characteristics. Until such time as a temperature control process for the cooking appliance 30 is actually required, the corresponding data are present in the hob control circuit, and can be employed accordingly.

Advantageously, the identification, together with the associated characteristics, are stored in the hob control circuit 15 or in a corresponding memory. This provides an advantage in that, for future cooking processes using this cooking appliance 30, no further downloading of characteristics from the cloud is required. Only the reading out of the identification of the cooking appliance 30, using the NFC reader 22, will be required. If the hob control circuit 15 then recognizes that these characteristics have already been stored, which will be anticipated in practice in the event of the multiple use of the cooking appliance concerned, no additional downloading of the desired characteristics will be required. To this end, it can be provided that the identification of the cooking appliance 30 includes not only the type thereof, but also the unique and individual identifier thereof. Each individual cooking appliance can thus be stored in practice.

Figure 3:
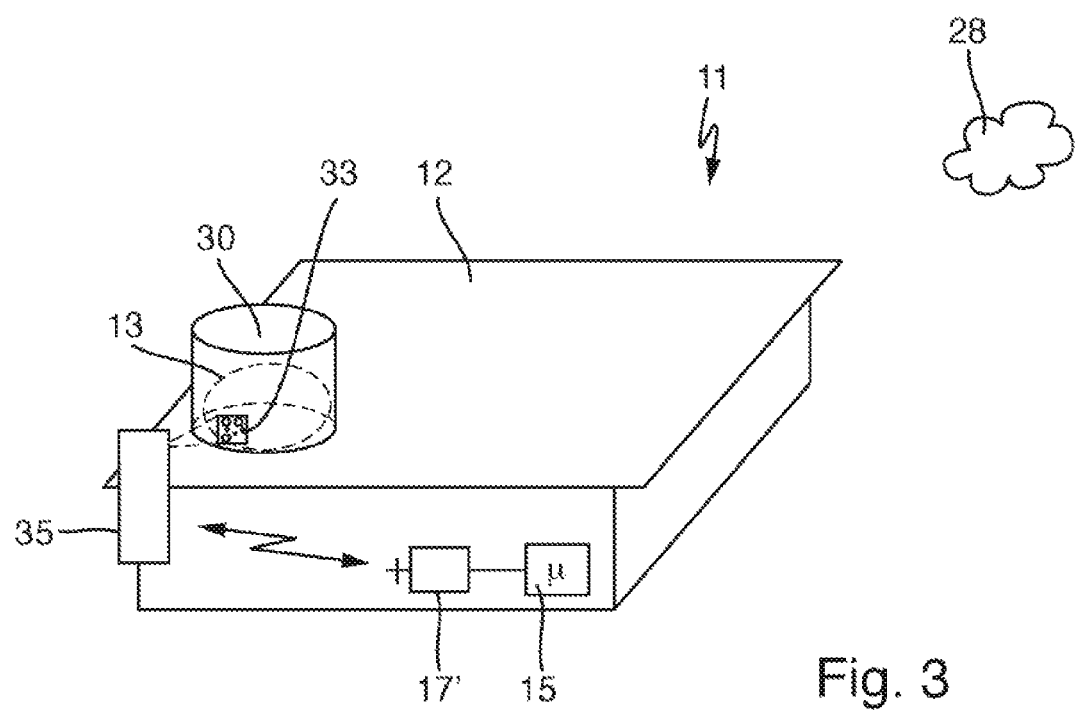
FIG. 3 shows a further variation of the invention, wherein the identification of the cooking appliance is read out from a mobile telephone and is transmitted to the Internet or to a cloud storage facility.

FIG. 3 represents a further configuration of the invention having a hob 11 of a similar type to that described above, namely, having a hob plate 12 and heating devices 13. A hob control circuit 15 is provided, incorporating a counterpart communication device 17, in this case again configured, for example, in the form of a Bluetooth module. However, the hob 11 features no identification region on the hob plate 12. By way of identification means, the cooking appliance 30 carries a QR code or, alternatively, a barcode. In order to detect the latter, the camera of a mobile telephone 35 is oriented such that the QR code 33 can be read out, and the information or identification retrieved accordingly. As a further alternative to this identification, an alphanumeric code might be printed or embossed which constitutes an individual identifier and thus the identification of the cooking appliance 30. This code can also be easily detected using a mobile phone 35, by the recording of a camera image. This identification is then shared by the mobile telephone 35, as described above with reference to FIG. 2, either directly or indirectly with the Internet or with the cloud storage facility 28, from which characteristics with respect to this cooking appliance 30 can then be retrieved. These are then delivered to the hob control circuit 15 via the Bluetooth connection. Herein, it can advantageously be provided that the identification of the cooking appliance 33, which has been read out by the mobile telephone 35 from the QR code 33, is simultaneously, if not firstly transmitted to the hob control circuit 15 by Bluetooth. The hob control circuit 15 will thus be aware of exactly which cooking appliance 30 is now in position. If the characteristics thereof, for example, have already been stored, this will be communicated to the mobile telephone 35, such that no further retrieval thereof by the latter from the cloud storage facility 28 will be required. The process is then complete, and a temperature-controlled heating of the cooking appliance 30 can be executed. Alternatively, the characteristics of this cooking appliance 30, by reference to the individual identification thereof, are retrieved from the cloud storage facility 28 and stored by Bluetooth in the hob control circuit 15 for the next process and for subsequent processes.

According to one option, the positioning of the cooking appliance 30 in the identification region 21, and the removal thereof, can be detected using additional pot detection means, in a known manner. Alternatively, this can be executed by means of the NFC reader 22, which establishes that the cooking appliance 30 or the NFC tag 32 thereof can no longer be detected, and must have been removed accordingly. If it is then located elsewhere, it is possible, on the basis of a temporal connection, to establish that this specific cooking appliance 30 has been moved to a new location.

Options for the operation of a cooking appliance 30 on the hob 11 or on a heating device 13 have been described above. For example, a water temperature, or any temperature of food contained in the cooking appliance 30, which is predefined by an operator, can be achieved and maintained. Likewise, a cooking time or boiling time can be set and observed. Further possibilities include the heating or warming of food contained in the cooking appliance 30.

The invention claimed is:

1. Method for operating a hob for heating of a cooking appliance with foodstuff contained in said cooking appliance, wherein said cooking appliance has a cooking appliance base, and wherein said hob comprises:
   a hob plate and at least one heating device being arranged below said hob plate,
   a hob control circuit, a power supply for said at least one heating device, and a communication device being configured to communicate with a counterpart communication device being arranged externally to said hob,
   wherein said cooking appliance has said cooking appliance base and has contactlessly readable or scannable identification means incorporating an identification of said cooking appliance,
   wherein the following steps are executed:
   said identification of said cooking appliance reading out by said identification means, and said identification transmitting to said hob control circuit,
   said hob control circuit connecting via said communication device to said counterpart communication device, said counterpart communication device being arranged externally to said hob and is connected to an information-gathering facility,
   in said information-gathering facility, characteristics of said cooking appliance related to said cooking appliance base storing, including information from the following group: regulating characteristics, control characteristics, operating characteristics and display characteristics,
   said information with respect to said cooking appliance base is uploaded to said hob control circuit,
   said cooking appliance positioning, or moving to a position, on said hob plate above said at least one heating device,
   said hob control circuit calculates or receives information with respect to said at least one heating device above which said cooking appliance is positioned, and actuates said at least one heating device for said heating of said cooking appliance, using downloaded and optionally stored information with respect to said cooking appliance base,
   a temperature of said cooking appliance base detecting by said hob, by reference to information with respect to said cooking appliance base, and a temperature-controlled heating of said cooking appliance base is executed by means of said at least one heating device, by reference to said information,
   a temperature measurement of said cooking appliance base executing by means of inductive coupling with a natural resonance measuring circuit in said cooking appliance base, or by means of an oscillating circuit comprising said cooking appliance base and an induction coil.

2. The method according to claim 1, wherein said hob comprises an operator control device, in appearance or with respect to operating functions, is tailored to a type of said cooking appliance, or to said cooking appliance, on a basis of said information with respect to said cooking appliance.

3. The method according to claim 1, wherein, for said heating of said cooking appliance base, various target temperatures can be specified.

4. The method according to claim 3, wherein:
   said various target temperatures are input on an operator control device that, in appearance of with respect to operating functions, is tailored to a type of cooking appliance, or to said cooking appliance, on a basis of said information with respect to said cooking appliance, and
   said hob control circuit executes a temperature setting said cooking appliance base, to said temperature, by means of said heating device.

5. The method according to claim 1, wherein said downloaded information with respect to said cooking appliance base is employed for adjustment of a setting of said heating of said cooking appliance base, or of a temperature setting thereof.

6. The method according to claim 1, wherein said heating device is an induction heating coil constituting said induction coil in said oscillating circuit.

7. The method according to claim 1, wherein said hob has a pot detection device, and it can thus be detected whether and where said cooking appliance is present on said hob plate.

8. The method according to claim 1, wherein said identification means of said cooking appliance is read out by an identification device in said hob itself.

9. The method according to claim 8, wherein a specific identification region is provided on said hob and wherein, further to the detection of positioning of said cooking appliance having identification means in said identification region, said identification device detects and reads out said identification means.

10. The method according to claim 1, wherein said identification means of said cooking appliance are readable by means of a portable terminal device, wherein said identification means are read out by the portable terminal device.

11. The method according to claim 10, wherein said identification means are a printed QR code or a barcode and wherein said portable terminal device transmits said information wirelessly to said communication device of said hob.

12. The method according to claim 1, wherein said communication device of the hob connects directly to Internet or to a cloud storage facility for downloading of information.

13. The method according to claim 1, wherein said hob, with said communication device, constitutes a communication link with a portable terminal device, wherein said portable terminal device connects to Internet or to a cloud storage facility, such that said information is firstly downloaded to said portable terminal device, then transferred from said portable terminal device via said communication device to said hob control circuit.

14. The method according to claim 1, wherein at least a proportion of information on said cooking appliance is included in said identification means.

15. The method according to claim 1, wherein said information-gathering facility is in the form of an Internet connection to a database or to a cloud storage facility.

16. The method according to claim 1, wherein said information with respect to said cooking appliance is stored in a memory of said hob control circuit.

17. A hob for executing the method according to claim 1.

18. Hob system comprising the hob according to claim 17 and said cooking appliance configured for the preparation of food contained therein, wherein said cooking appliance has an individual identification means such as an RFID tag, an NFC tag, a QR code or a barcode.

* * * * *